(12) United States Patent
Friot et al.

(10) Patent No.: US 9,973,063 B2
(45) Date of Patent: May 15, 2018

(54) COMBINED STATOR WEDGE DRIVER AND BAR JACKING TOOL

(71) Applicant: General Electric Company, Schenectady, NY (US)

(72) Inventors: Darren Friot, Schenectady, NY (US); David Robert Schumacher, Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 144 days.

(21) Appl. No.: 14/879,200

(22) Filed: Oct. 9, 2015

(65) Prior Publication Data

US 2017/0104396 A1  Apr. 13, 2017

(51) Int. Cl.
*B23P 19/00* (2006.01)
*H02K 15/00* (2006.01)
*H02K 15/06* (2006.01)

(52) U.S. Cl.
CPC ....... *H02K 15/0018* (2013.01); *H02K 15/063* (2013.01)

(58) Field of Classification Search
CPC .. H02K 15/0018; H02K 15/063; H02K 3/487; B25B 27/026
See application file for complete search history.

(56) References Cited

U.S. PATENT DOCUMENTS

| | | | | |
|---|---|---|---|---|
| 3,626,432 A | * | 12/1971 | Fohl ..................... | H02K 15/068 29/732 |
| 3,888,638 A | * | 6/1975 | Walker .................. | H02K 15/10 29/734 |
| 4,347,657 A | * | 9/1982 | Barrera ................. | H02K 15/068 29/596 |
| 4,455,743 A | * | 6/1984 | Witwer ............... | H02K 15/0037 29/564.1 |
| 4,594,771 A | * | 6/1986 | Appenzeller ...... | H02K 15/0018 29/407.01 |
| 5,012,684 A | * | 5/1991 | Humphries .............. | G01B 7/14 324/207.18 |
| 5,075,959 A | * | 12/1991 | Keck ................... | H02K 15/0006 29/267 |
| 5,524,474 A | * | 6/1996 | Lavallee .................. | G01B 7/14 73/12.09 |

(Continued)

FOREIGN PATENT DOCUMENTS

AT   505 711 A1   3/2009
GB   2 451 338 A   1/2009

OTHER PUBLICATIONS

Extended European Search Report and Opinion issued in connection with corresponding EP Application No. 16192865.0 dated Mar. 29, 2017.

*Primary Examiner* — Paul D Kim
(74) *Attorney, Agent, or Firm* — Eversheds Sutherland (US) LLP

(57) ABSTRACT

The present application provides a combined stator wedge driver and bar jacking tool for positioning a stator bar and a stator wedge into place along a slot of a stator core. The combined stator wedge driver and bar jacking tool may include a bar jacking tool to drive the stator bar into the slot and a stator wedge driver to drive the stator wedge on top of the stator bar in the slot. The bar jacking tool and the stator wedge driver extend from a common housing.

16 Claims, 7 Drawing Sheets

(56) References Cited

U.S. PATENT DOCUMENTS

| | | | |
|---|---|---|---|
| 6,069,473 A * | 5/2000 | Hatley | G01B 7/144 |
| | | | 324/207.18 |
| 6,708,395 B2 | 3/2004 | Pezzano et al. | |
| 7,202,587 B2 * | 4/2007 | Sargeant | H02K 1/185 |
| | | | 310/418 |
| 7,707,710 B2 | 5/2010 | Lape et al. | |
| 7,770,288 B2 | 8/2010 | Lape et al. | |
| 7,990,012 B2 * | 8/2011 | Lape | H02K 3/487 |
| | | | 310/214 |
| 8,346,514 B2 | 1/2013 | Lape et al. | |
| 8,736,276 B2 * | 5/2014 | Stonehouse | H02K 3/487 |
| | | | 310/214 |
| 8,987,970 B2 * | 3/2015 | Uchida | H02K 3/487 |
| | | | 310/214 |
| 2004/0124730 A1 | 7/2004 | Yamaguchi et al. | |
| 2006/0108728 A1 | 5/2006 | Schumacher et al. | |
| 2006/0108889 A1 | 5/2006 | Schumacher et al. | |
| 2007/0068998 A1 | 3/2007 | Silliman et al. | |
| 2008/0036336 A1 * | 2/2008 | Salem | H02K 11/22 |
| | | | 310/68 B |
| 2009/0031556 A1 * | 2/2009 | Lape | B25B 27/023 |
| | | | 29/732 |
| 2010/0242260 A1 | 9/2010 | Schumacher et al. | |
| 2012/0074204 A1 | 3/2012 | Schumacher et al. | |
| 2012/0117790 A1 | 5/2012 | Carpentier et al. | |
| 2013/0140935 A1 | 6/2013 | Houle | |
| 2015/0008781 A1 | 1/2015 | Tanavde et al. | |
| 2015/0244230 A1 | 8/2015 | Yoon et al. | |
| 2016/0359385 A1 * | 12/2016 | Buskirk | H02K 15/0018 |

* cited by examiner

COMBINED STATOR WEDGE DRIVER AND BAR JACKING TOOL

TECHNICAL FIELD

The present application and the resultant patent relate generally to dynamoelectric machines and more particularly relate to a tool for installing a stator bar and other types of stator components into the stator core of a generator in a fast and efficient manner.

BACKGROUND OF THE INVENTION

Dynamoelectric machines, such as electrical generators, generally may have a stator or armature core with stacked laminations of a magnetic material formed in an annular assembly. An array of axially extending and circumferentially spaced stator core slots may be formed through the radial surface of the stator core. Assembled stator bars with stator windings then may be disposed in these slots. The stator bars may be held in place by a slot support system that may include stator wedges, stator slides, filler strips, and ripple springs. These support components may maintain the stator bars in a radially tight position within the slots. The wedges, slides, filler strips, and ripple springs may impose radial forces on the stator bars and aid in resisting magnetic and electrically induced radial forces.

The stator wedges may be received within axial dovetail slots on opposite sidewalls of the radial slots. During the process of tightening the stator wedges, a stator slide may be installed against each stator wedge. Specifically, reference will be made herein to "stator wedges" that are seated in the dovetail slots and "stator slides" that are used to tighten the wedges. The stator slides may be pre-gauged and pre-sized to have a significant interference fit relative to the stator bars, the fillers, and the ripple springs. The force required to install the various stator components may be significant. Moreover, thousands of the stator wedges and other components typically may be used in a conventional generator such that installation may be a very time intensive and expensive procedure.

Several methods have been used to provide the force required to install the stator components. Each of these methods, however, may have certain drawbacks. For example, a known stator bar jacking tool generally cannot be positioned at the point of wedge insertion but instead required the point of insertion to be at a distance therefrom. Stator slides generally have been manually installed using a drive board and a large hammer or by using a modified pneumatically operated hammer. These methods, however, not only may be time consuming, they also may place considerable strain on the operator. These methods may subject the operator to fatigue, the risk of repetitive motion injury and/or hearing damage, and may pose a risk to the integrity of the stator components. The uniformity and consistency of the tightness of the stator wedge and the stator slide also may be poor using the above-described methods.

SUMMARY OF THE INVENTION

The present application and the resulting patent thus provide a combined stator wedge driver and bar jacking tool for positioning a stator bar and a stator wedge and other stator component into place along a slot of a stator core. The combined stator wedge driver and bar jacking tool may include a bar jacking tool to drive the stator bar into the slot and a stator wedge driver to drive the stator wedge on top of the stator bar in the slot. The bar jacking tool and the stator wedge driver may extend from a common housing.

The present application and the resulting patent further provide a method of positioning a stator bar and a stator wedge into place along a slot of a stator core. The method may include the steps of positioning a combined stator wedge driver and bar jacking tool about the slot, hydraulically driving the stator bar into the slot via a bar jacking tool of the combined stator wedge driver and bar jacking tool, and hydraulically driving the stator wedge on top of the stator bar in the slot via a stator wedge driver of the combined stator wedge driver and bar jacking tool.

The present application and the resultant patent further provide a combined stator wedge driver and bar jacking tool for positioning a stator bar and a stator wedge into place along a slot of a stator core. The combined stator wedge driver and bar jacking tool may include a hydraulic bar jacking tool to drive the stator bar into the slot and a hydraulic stator wedge driver to drive the stator wedge on top of the stator bar in the slot. The hydraulic bar jacking tool and the hydraulic stator wedge driver extending from a common housing.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
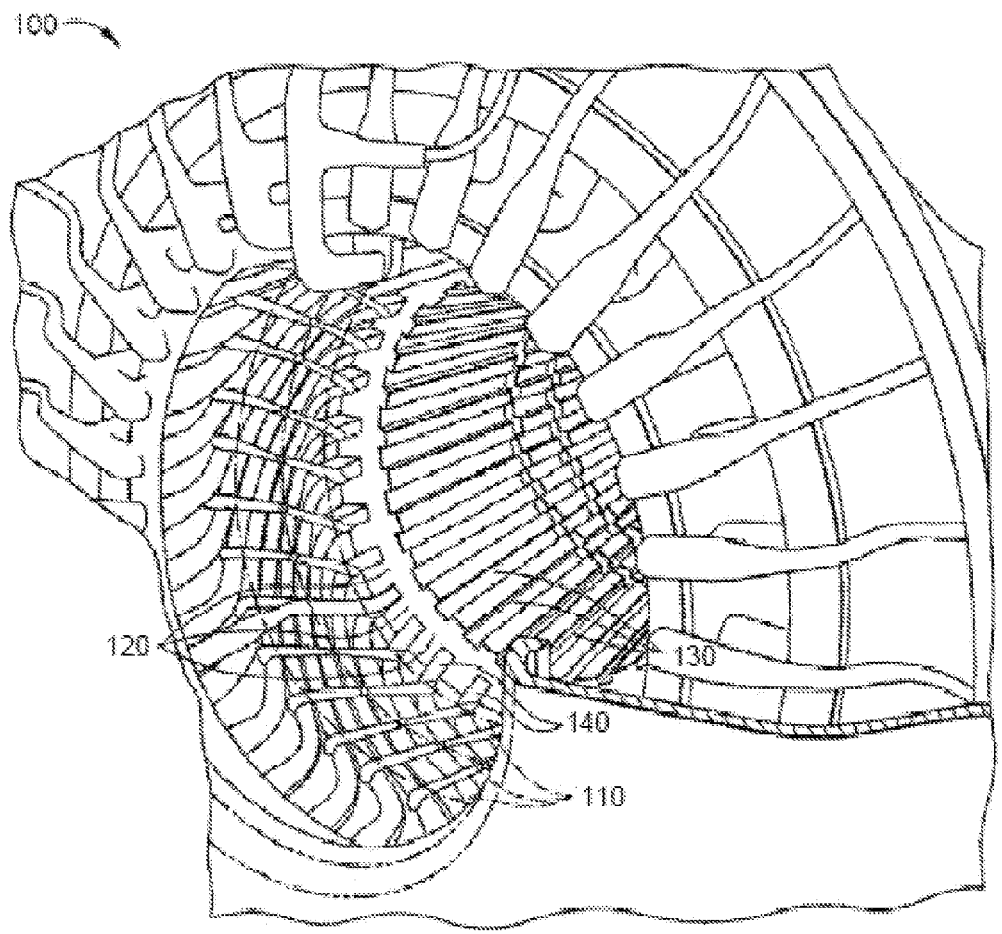
FIG. 1 is a perspective view of a portion of an exemplary dynamoelectric generator.

Referring now to the drawings, in which like numerals refer to like elements throughout the several views, FIG. 1 is a perspective end view of an exemplary electrical generator 100. A rotor 110 may be transparently represented by the dashed lines. A stator core 120 may have a number of stator slots 130 defined around an inner radial circumference thereof. A number of stator bars 140 may be positioned within each of the stator slots 130. Other components and other configurations also may be used herein.

Figure 2:
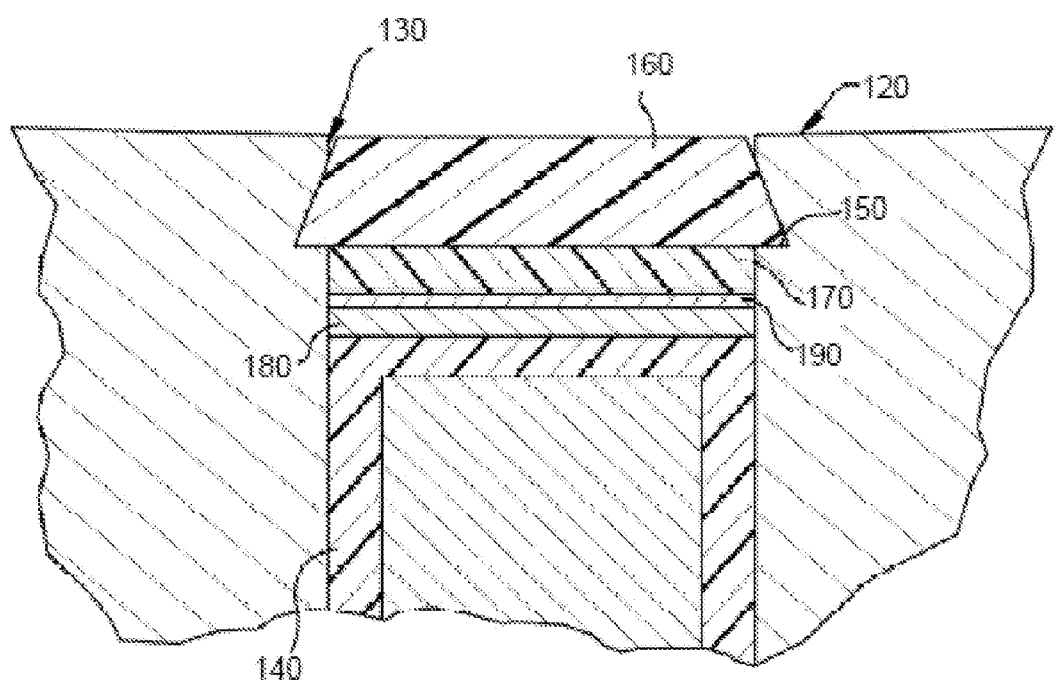
FIG. 2 is a side sectional view of a stator core slot with a stator bar, a stator slide, a stator wedge, and other components.
Figure 3:
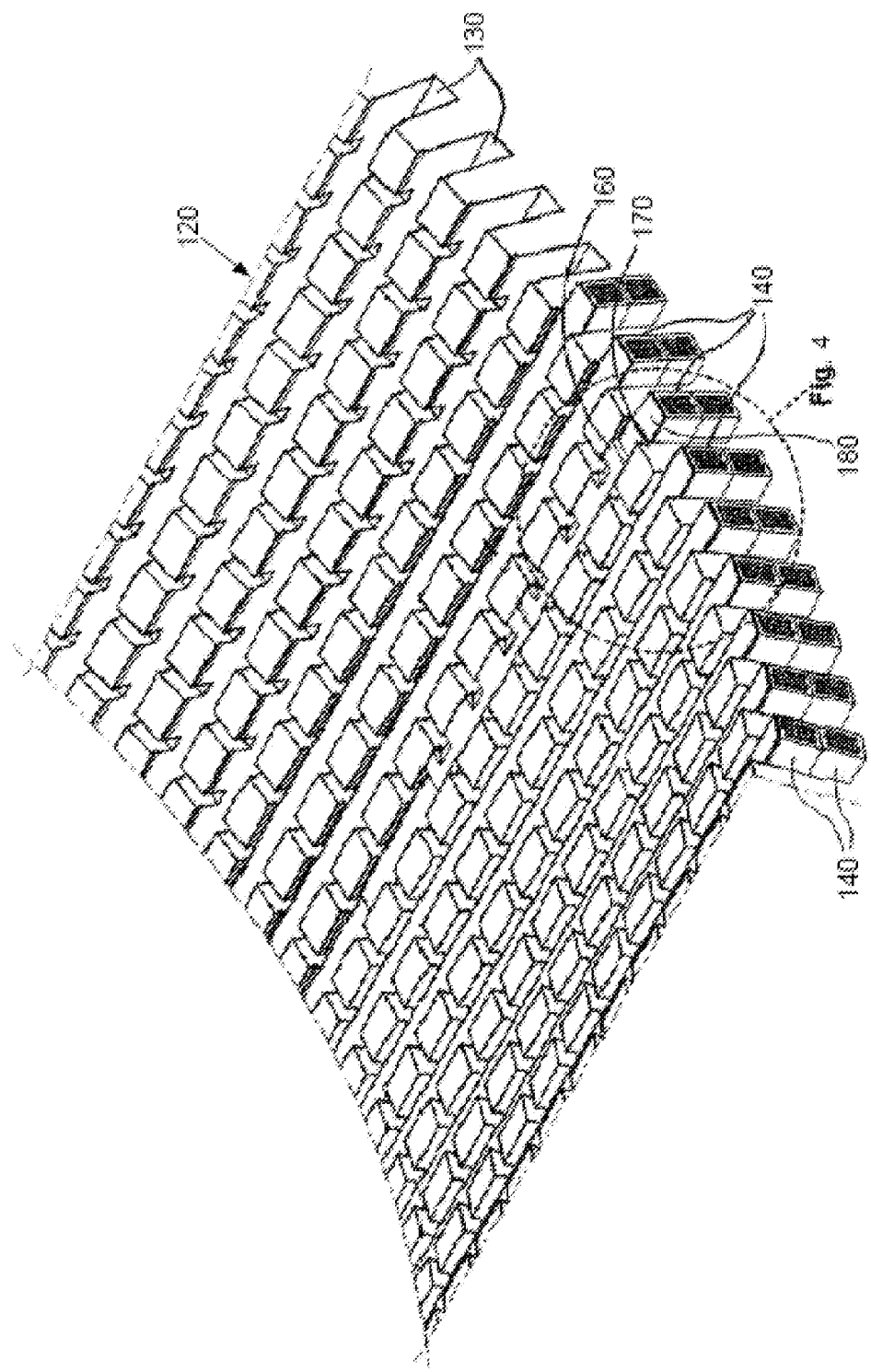
FIG. 3 is a partial perspective view of a stator core with a number of stator components.
Figure 4:
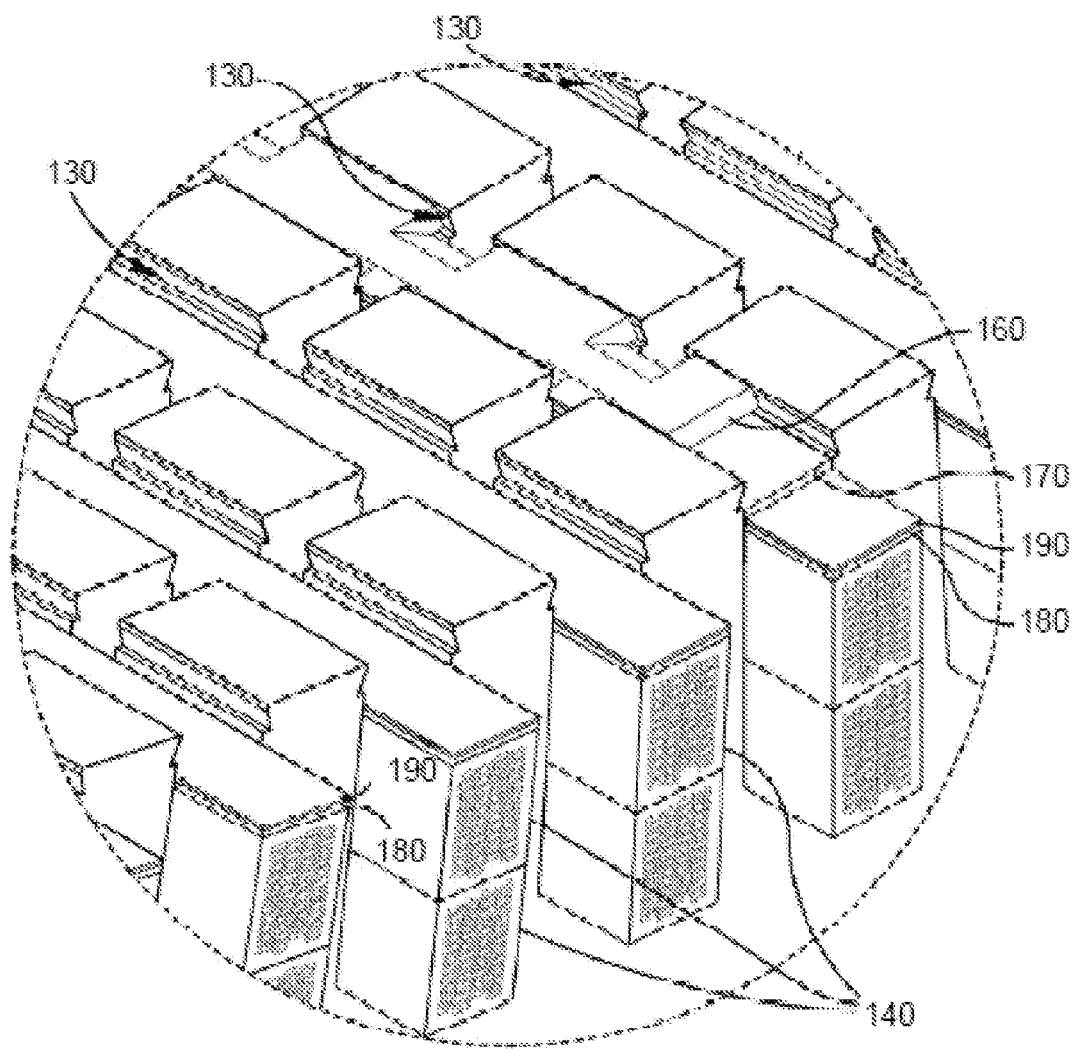
FIG. 4 is an enlarged partial perspective view of the stator core and components of FIG. 3.

Referring to FIGS. 2-4, the radially oriented stator slots 130 extend axially along the stator core 120 with the stator bars 140 seated therein. Typically, one or two stator bars 140 may be present in each slot 130, but any number of stator bars 140 may be used herein. A dovetail groove or undercut 150 may be positioned in opposed side walls of each of the slots 130. One or more stator wedges 160 and stator slides 170 may be inserted in an axial direction along the length of the slots 130 with the stator wedge 160 positioned within the dovetail groove 150. Moreover, flat filler strips 180 and ripple springs 190 and the like may be disposed between the stator bars 140 and the stator wedges 160 and stator slides 170. Other components and other configurations may be used herein.

The stator wedges 160, the stator slides 170, and the filler strips 180 may be constructed of a woven glass fabric combined with a high temperature resin. Such a material may have excellent mechanical strength and electrical properties at elevated temperatures. The ripple springs 190 may be constructed of a unidirectional glass fabric combined with epoxy resin and the like. The ripple springs 190 may have a wavy or sinusoidal shape along the length. This waviness may provide the ripple springs 190 with resiliency so as to aid in absorbing the expansion and contraction of the stator components during the various operating cycles of the electrical generator 100 while maintaining the stator bars 140 tightly constrained within the stator slots 130. Alternatively, any other suitable material can be used for the stator wedges, the stator slides, the filler strips, and the ripple springs. Other components and other configurations may be used herein.

Figure 5:
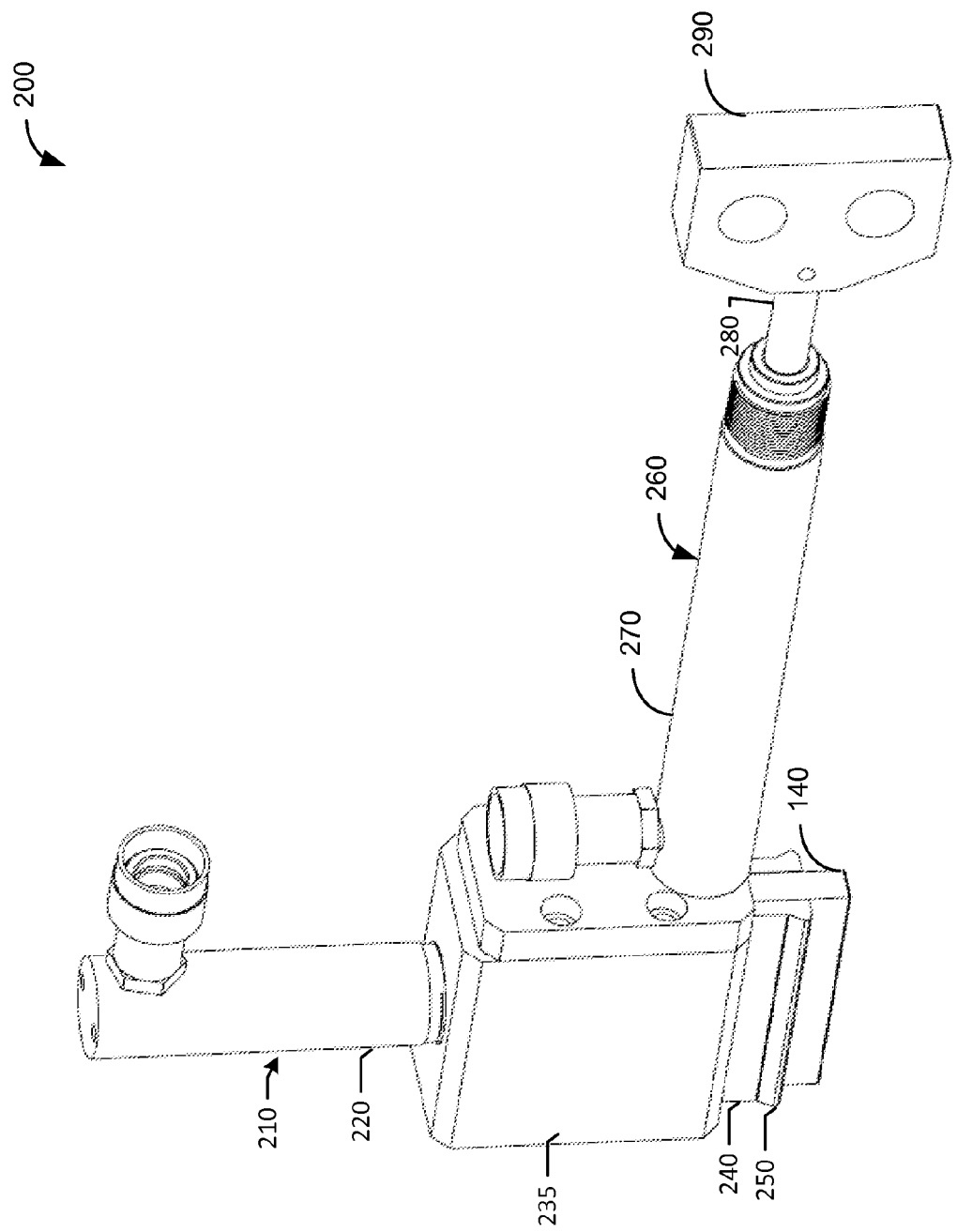
FIG. 5 is a perspective view of a combined stator wedge driver and bar jacking tool as may be described herein.
Figure 6:
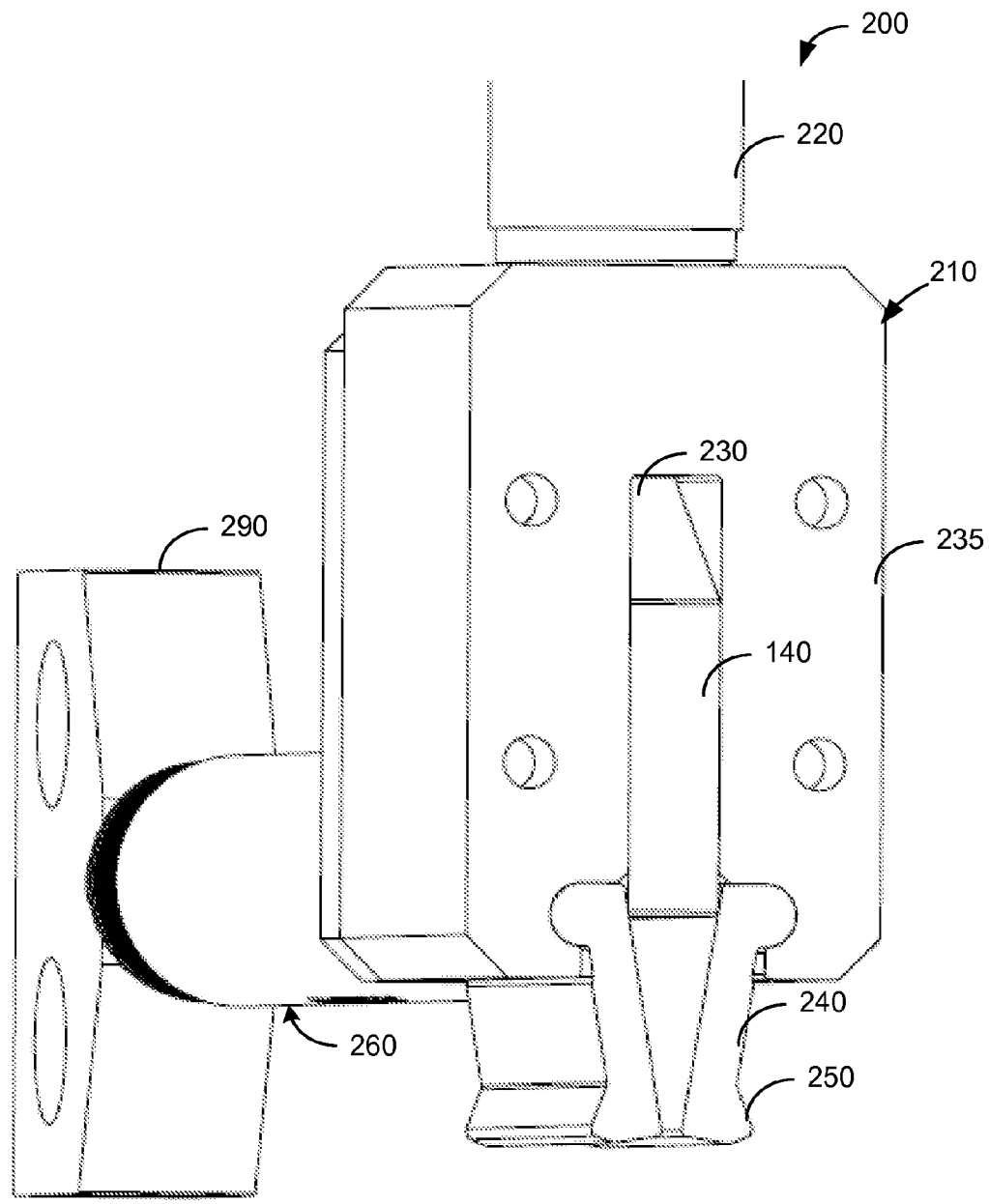
FIG. 6 is a partial end perspective view of the combined stator wedge driver and bar jacking tool of FIG. 5.
Figure 7:
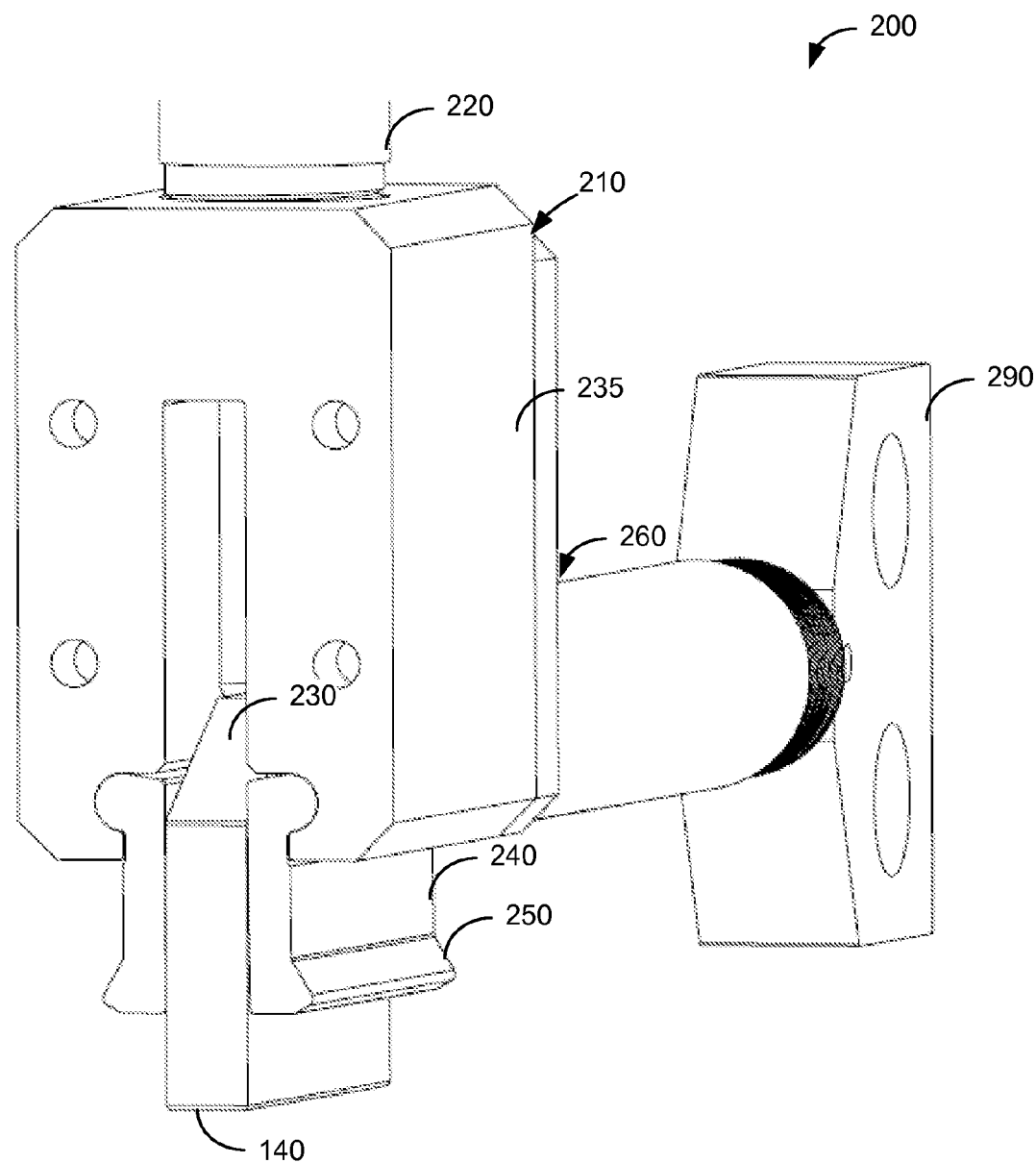
FIG. 7 is a further partial end perspective view of the combined stator wedge driver and bar jacking tool of FIG. 5 in operation.

FIGS. 5-7 show a combined stator wedge driver and bar jacking tool as may be described herein. The combined stator wedge driver and bar jacking tool 200 may be used to install the stator bar 140 within the slots 130 as well as the wedges 160, the slides 170, the strips 180, the ripple springs 190, and perhaps other components in a fast and efficient manner.

The combined stator wedge driver and bar jacking tool 200 includes a bar jacking tool 210. The bar jacking tool 210 may be hydraulically powered via a bar hydraulic cylinder 220 and the like. The bar hydraulic cylinder 220 may reciprocally drive a bar ram 230 in a substantially vertical direction. The bar hydraulic cylinder 220 and the bar ram 230 may have any suitable size, shape, or configuration. The bar hydraulic cylinder 220 may be of conventional design. Other types of drive mechanisms also may be used herein. The bar hydraulic cylinder 220 and the bar ram 230 may be mounted about a common housing 235. The common housing 235 may have any suitable size, shape, or configuration. Other components and other configurations also may be used herein.

The bar jacking tool 210 may include a pair of anchor jaws 240 positioned about the end of the bar ram 230 for pivoting thereabout via a pivot pin and the like. Each of the anchor jaws 240 may include a hook 250 or a similar structure at the remote end thereof. The hook 250 may be sized and shaped to accommodate the dovetail groove 150 of the slots 130. The anchor jaws 240 may be forced against the wall of the slots 130 with the hook 250 positioned within the dovetail groove 150 by the downward motion of the bar ram 230. Continued downward motion of the bar ram 230 forces the stator bar 140 safely within the slot 130. The bar ram 230 uses sufficient force to position the stator bar 140 therein without damage. Other components and other configurations may be used herein.

The combined stator wedge driver and bar jacking tool 200 also may include a stator wedge driver 260. The stator wedge driver 260 also may be hydraulically driven and may include a wedge driver hydraulic cylinder 270. The wedge driver hydraulic cylinder 270 may reciprocally drive a wedge driver ram 280 and a driving block 290 in a substantially horizontal direction. The wedge driver hydraulic cylinder 270, the wedge driver ram 280, and the driving block 290 may have any suitable size, shape, or configuration. The wedge driver hydraulic cylinder 270 may be of conventional design. The wedge driver hydraulic cylinder 270 may be positioned about the common housing 235. The stator wedge driver 260 drives the wedges 160, the slides 170, the strips 180, and ripple springs 190 into place on top of a stator bar 140. Other types of drive mechanisms also may be used herein. Other components and other configurations may be used herein.

In use, the combined stator wedge driver and bar jacking tool 200 may be positioned about a slot 130 of the stator core 120. The anchor jaws 240 of the bar jacking tool 210 may be forced inward with the hooks 250 positioned into the dovetail grooves 150. The anchor jaws 240 may act as an anchor point for the bar jacking tool 210 to push the stator bar 140 into the slot 130 via the bar hydraulic cylinder 220 and the bar ram 230. Likewise, the stator wedge driver 260 drives the wedges 160, the slides 170, the strips 180, and ripple springs 190 into place on top of an adjacent stator bar 140 via the wedge driver hydraulic cylinder 270, the wedge driver ram 280, and the driving block 290. The positioning of the anchor jaws 240 also may anchor the stator wedge driver 260 as the stator wedge driver 260 drives the wedges 160, the slides 170, the strips 180, and the ripple springs 190 into place. Other components and other configurations also may be used herein.

The combined stator wedge driver and bar jacking tool 200 thus combines the bar jacking tool 210 and the stator wedge driver 260 into a single tool. The distance from the point of bar jacking to the point of wedge insertion may be reduced significantly herein so as to ensure that there are no vertical gaps in the slot 130 so as to ensure high performance ripple spring compression. The combined stator wedge driver and bar jacking tool 200 may be inserted at any point along the axial length of the stator core 120 for improved adjustability. The combined stator wedge driver and bar jacking tool 200 uses the anchor jaws 240 so as to anchor the tool in place during operation. The combined stator wedge driver and bar jacking tool 200 thus may significantly decrease the amount of time required to install the stator components as well as provide an associated cost savings.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A combined stator wedge driver and bar jacking tool for positioning a stator bar and a stator wedge into place along a slot of a stator core, comprising:
   a bar jacking tool to drive the stator bar into the slot, wherein the bar jacking tool comprises a bar hydraulic cylinder, a bar ram driven by the bar hydraulic cylinder, and a pair of anchor jaws operable by the bar ram;
   a stator wedge driver to drive the stator wedge on top of the stator bar in the slot; and
   the bar jacking tool and the stator wedge driver extending from a common housing.

2. The combined stator wedge driver and bar jacking tool of claim 1, wherein the bar ram extends through the common housing.

3. The combined stator wedge driver and bar jacking tool of claim 1, wherein the slot comprises a groove therein and wherein the pair of anchor jaws comprises a hook sized to accommodate the groove.

4. The combined stator wedge driver and bar jacking tool of claim 1, wherein the stator wedge driver comprises a wedge driver hydraulic cylinder.

5. The combined stator wedge driver and bar jacking tool of claim 4, wherein the stator wedge driver comprises a wedge driver ram driven by the wedge driver hydraulic cylinder.

6. The combined stator wedge driver and bar jacking tool of claim 5, wherein the stator wedge driver comprises a driving block driven by the wedge driver hydraulic cylinder and the wedge driver ram.

7. The combined stator wedge driver and bar jacking tool of claim 1, wherein the stator wedge driver drives a stator slide between the stator bar and the stator wedge.

8. The combined stator wedge driver and bar jacking tool of claim 1, wherein the stator wedge driver drives a stator strip between the stator bar and the stator wedge.

9. The combined stator wedge driver and bar jacking tool of claim 1, wherein the stator wedge driver drives a stator ripple spring between the stator bar and the stator wedge.

10. The combined stator wedge driver and bar jacking tool of claim 1, wherein the stator wedge driver drives a stator slide, a stator strip, and a stator ripple spring between the stator bar and the stator wedge.

11. The combined stator wedge driver and bar jacking tool of claim 1, wherein the stator wedge driver drives a plurality of stator wedges into place along the slot.

12. A method of positioning a stator bar and a stator wedge into place along a slot of a stator core, comprising:
   positioning a combined stator wedge driver and bar jacking tool about the slot;
   hydraulically driving the stator bar into the slot via a bar jacking tool of the combined stator wedge driver and bar jacking tool, wherein the bar jacking tool comprises a bar hydraulic cylinder, a bar ram driven by the bar hydraulic cylinder, and a pair of anchor jaws operable by the bar ram; and
   hydraulically driving the stator wedge on top of the stator bar in the slot via a stator wedge driver of the combined stator wedge driver and bar jacking tool.

13. A combined stator wedge driver and bar jacking tool for positioning a stator bar and a stator wedge into place along a slot of a stator core, comprising:
   a hydraulic bar jacking tool to drive the stator bar into the slot, wherein the hydraulic bar jacking tool comprises a bar hydraulic cylinder, a bar ram driven by the bar hydraulic cylinder, and a pair of anchor jaws operable by the bar ram;
   a hydraulic stator wedge driver to drive the stator wedge on top of the stator bar in the slot; and
   the hydraulic bar jacking tool and the hydraulic stator wedge driver extending from a common housing.

14. The combined stator wedge driver and bar jacking tool of claim 13, wherein the bar ram extends through the common housing.

15. The combined stator wedge driver and bar jacking tool of claim 13, wherein the hydraulic stator wedge driver comprises a wedge driver ram and a driving block.

16. The combined stator wedge driver and bar jacking tool of claim 13, wherein the hydraulic stator wedge driver drives a stator slide, a stator strip, and a stator ripple spring between the stator bar and the stator wedge.

\* \* \* \* \*